United States Patent
Ikonin

(10) Patent No.: US 11,115,680 B2
(45) Date of Patent: Sep. 7, 2021

(54) APPARATUSES AND METHODS FOR ENCODING AND DECODING A PANORAMIC VIDEO SIGNAL

(71) Applicant: Huawei Technologies Co., Ltd., Shenzhen (CN)

(72) Inventor: Sergey Yurievich Ikonin, Moscow (RU)

(73) Assignee: Huawei Technologies Co., Ltd., Shenzhen (CN)

(*) Notice: Subject to any disclaimer, the term of this patent is extended or adjusted under 35 U.S.C. 154(b) by 33 days.

(21) Appl. No.: 16/664,466

(22) Filed: Oct. 25, 2019

(65) Prior Publication Data

US 2020/0059668 A1 Feb. 20, 2020

Related U.S. Application Data

(63) Continuation of application No. PCT/RU2017/000270, filed on Apr. 26, 2017.

(51) Int. Cl.
| | |
|---|---|
| *H04N 19/597* | (2014.01) |
| *H04N 19/103* | (2014.01) |
| *H04N 19/176* | (2014.01) |
| *H04N 19/43* | (2014.01) |
| *H04N 19/513* | (2014.01) |
| *H04N 7/00* | (2011.01) |

(52) U.S. Cl.
CPC ......... *H04N 19/597* (2014.11); *H04N 19/103* (2014.11); *H04N 19/176* (2014.11); *H04N 19/43* (2014.11); *H04N 19/513* (2014.11)

(58) Field of Classification Search
CPC ...... H04N 19/43; H04N 19/51; H04N 19/103; H04N 19/176; H04N 19/503; H04N 19/513; H04N 19/597
See application file for complete search history.

(56) References Cited

U.S. PATENT DOCUMENTS

| | | | |
|---|---|---|---|
| 5,561,756 A | * | 10/1996 | Miller ..................... G06T 15/04 |
| | | | 345/649 |
| 2009/0028248 A1 | | 1/2009 | Kitahara et al. |

(Continued)

FOREIGN PATENT DOCUMENTS

| | | |
|---|---|---|
| JP | 2013046270 A | 3/2013 |
| WO | 2008114264 A2 | 9/2008 |

OTHER PUBLICATIONS

Heithausen et al., "Motion Compensation with Higher Order Motion Models for HEVC," ICASSP, 2015 IEEE International Conference, Institute of Electrical and Electronics Engineers, New York, New York (2015).

(Continued)

*Primary Examiner* — Peet Dhillon
(74) *Attorney, Agent, or Firm* — Leydig, Voit & Mayer, Ltd.

(57) ABSTRACT

The disclosure relates to an apparatus for encoding a video signal, wherein the video signal is a two-dimensional projection of a panoramic video signal and comprises a plurality of successive frames, including a reference frame and a current frame, wherein each frame of the plurality of successive frames comprises a plurality of video coding blocks and wherein each video coding block comprises a plurality of pixels.

16 Claims, 12 Drawing Sheets

(56) References Cited

U.S. PATENT DOCUMENTS

| | | | | |
|---|---|---|---|---|
| 2009/0290809 | A1* | 11/2009 | Yamada | G06T 7/215 |
| | | | | 382/266 |
| 2016/0112704 | A1 | 4/2016 | Grange et al. | |
| 2016/0142697 | A1* | 5/2016 | Budagavi | H04N 13/156 |
| | | | | 348/43 |
| 2018/0184121 | A1* | 6/2018 | Kim | H04N 19/547 |
| 2018/0234669 | A1* | 8/2018 | Chen | H04N 13/221 |
| 2018/0359487 | A1* | 12/2018 | Bang | H04N 19/40 |
| 2019/0215532 | A1* | 7/2019 | He | H04N 19/172 |

OTHER PUBLICATIONS

"Choi et. al., "Test sequence formats for virtual reality video coding," Joint Video Exploration Team (JVET) of ITU-T SG 16 WP 3 and ISO/IEC JTC 1/SC 29/WG 11," Document: JVET-C0050, 3rd Meeting: Geneva, CH, pp. 1-6 (May 26-Jun. 1, 2016).

Sullivan, "Video Coding: Recent Developments for HEVC and Future Trends," Presentation for Data Compression Conference, Snowbird, Utah, pp. 1-25 (Mar. 30, 2016).

"Algorithm Description of Joint Exploration Test Model 1 (JEM 1)," ITU-T SG16 WP3 and ISO/IEC JTC1/SC29/WG11, Document N15790, Geneva, CH, pp. i-25 (Oct. 2015).

Sullivan et al., "Overview of the High Efficiency Video Coding (HEVC) standard," IEEE Transactions on Circuits Systems for Video Technology, vol. 22, No. 12, pp. 1649-1668, Institute of Electrical and Electronics Engineers, New York, New York (Dec. 2012).

"Series H: Audiovisual and Multimedia Systems Infrastructure of audiovisual services—Coding of moving video," ITU-T H.264, Advanced video coding for generic audiovisual services, pp. 1-804, International Union of Telecommunication, Geneva, Switzerland (Oct. 2016).

"Series H: Audiovisual and Multimedia Systems, Infrastructure of audiovisual services—Coding of moving video," ITU-T H.265, High efficiency video coding, pp. 1-664,International Union of Telecommunication, Geneva, Switzerland (Dec. 2016).

* cited by examiner

APPARATUSES AND METHODS FOR ENCODING AND DECODING A PANORAMIC VIDEO SIGNAL

CROSS-REFERENCE TO RELATED APPLICATIONS

This application is a continuation of International Application No. PCT/RU2017/000270, filed on Apr. 26, 2017, the disclosure of which is hereby incorporated by reference in its entirety.

TECHNICAL FIELD

The present disclosure relates to the field of video coding. More specifically, the disclosure relates to apparatuses and methods for encoding and decoding a panoramic video signal, such as a 360° video signal.

BACKGROUND

360° video is a new way of experiencing immersive video using devices such as Head Mounted Displays (HMD). This technique provides a "real life", "being there" experience for consumers by capturing the full panoramic view of the world. A 360° video signal is typically recorded using either a special rig of multiple cameras, or using a dedicated Virtual Reality (VR) camera that contains multiple camera lenses embedded into the device. The resulting footage is then stitched to form a single video, as described in "Video Coding: Recent Developments for HEVC and Future Trends" by Garry Sullivan, Presentation for Data Compression Conference, Snowbird, Utah, March 2016 and "Test sequence formats for virtual reality video coding, Document: JVET-C0050" by Kwang Pyo Choi et al., 3rd Meeting, Geneva, CH, 26 May-1 Jun. 2016. This process may be done either by the camera itself, or by using specialized video editing software that can analyze common visuals to synchronize and link the different camera feeds together to represent the full viewing sphere surrounding the camera rig. Essentially, the camera or the camera system maps a 360° scene onto a sphere.

The stitched image, i.e. the image on the surface of the sphere, is then mapped or unfolded from the spherical into a two-dimensional (2D) rectangular representation based on a projection. It is appreciated that there are different sphere-to-2D projection methods. One of the most popular methods is equirectangular projection, which is similar to a solution used in cartography to describe earth surface in a rectangular format on a plane. After being projected into 2D representation, video images are then coded using standard video codecs such as H.264/AVC and H.265/HEVC.

At the viewing end, once decoded the video images are mapped onto a virtual sphere with the viewer located at the center of the virtual sphere. The viewer can navigate inside the virtual sphere to see a view of the 360° world and thereby have an immersive experience.

To reduce bit-rates of video signals, the International Organization for Standardization (ISO) and International Telecommunication union (ITU) coding standards apply hybrid video coding with inter- and intra-frame prediction combined with transform coding of a prediction error. In the case of inter-prediction, the standard codecs H.264/AVC and H.265/HEVC use a motion (or displacement) vector to perform inter-prediction. For each block a motion vector that refers to the corresponding position in a previously transmitted reference image is estimated and transmitted. Then, the difference between the original and predicted block (called residual) is transformed to the frequency domain using, e.g., Discrete Cosine Transform (DCT) or Discrete Sine Transform (DST), quantized, and coded with entropy coding. More details can be found in Gary J. Sullivan et al., "Overview of the High Efficiency Video Coding (HEVC) Standard", in IEEE Transactions on Circuits and Systems for Video Technology, Vol. 22, No. 12, December 2012.

The effectiveness of inter-frame prediction strongly depends on motion models used for motion compensation. For instance, a translational motion model assumes that each block has one motion vector, which works well for most cases of traditional 2D videos. However, it is not so suitable for a spherical video especially unrolled to 2D projection. While moving from the center to the pole of the sphere, objects may rotate and change their shape and size after projection. As a panoramic video significantly differs from a traditional 2D video due to changed capturing and preprocessing procedures, methods that were developed for 2D video may be less efficient for this new type of content and need to be re-designed.

As described above more complex models are required in order to cover the motion in a 360° panoramic video. Higher order compensation models were proposed to handle more complex motion, for instance, as can be seen in "Motion compensation with high order motion models for HEVC", Cordula Heithausen & Jan Hendrik Vorwerk, ICASSP, 2015 IEEE International Conference. The basic idea behind that is to use additional one, two or more motion vectors to reflect complex transformation such as zoom, rotation, stretch, perspective etc. The problem of such an approach is that signaling of additional motion vectors generates additional signaling overhead that reduces the overall motion compensation effectiveness in terms of a rate-distortion criterion.

Thus, in light of the above there is a need for improved apparatuses and methods for encoding and decoding a panoramic video signal.

SUMMARY

It is an object of the disclosure to provide improved apparatuses and methods for encoding and decoding a panoramic video signal.

The foregoing and other objects are achieved by the subject matter of the independent claims. Further implementation forms are apparent from the dependent claims, the description and the figures.

According to a first aspect an apparatus for encoding a video signal is provided, wherein the video signal is a two-dimensional projection of a panoramic video signal and comprises a plurality of successive frames, including a reference frame and a current frame, each frame of the plurality of successive frames comprising a plurality of video coding blocks, each video coding block comprising a plurality of pixels, each pixel comprising at least one pixel value. The reference frame can be a frame earlier or later in time than the current frame. The reference frame can be directly preceding or succeeding the current frame or there can be one or more frames in between the reference frame and the current frame.

The encoding apparatus comprises: an inter prediction unit configured to determine a 3D reference motion vector on the basis of a first 3D position defined by a projection of a first pixel of a current video coding block of the current frame onto a viewing sphere and a second 3D position defined by a projection of a second pixel of a corresponding video coding block of the reference frame onto the viewing sphere and to predict at least one pixel of the current video coding block of the current frame on the basis of the 3D reference motion vector to generate a predicted video coding block for the current video coding block of the current frame on the basis of the corresponding video coding block of the reference frame; and an encoding unit configured to encode the current video coding block of the current frame on the basis of the predicted video coding block.

Thus, an improved encoding apparatus is provided, which allows encoding a panoramic video signal with an improved efficiency, as the 3D reference motion vector provides for a more efficient motion compensation.

In a further implementation form of the first aspect, the inter prediction unit is configured to determine the 3D reference motion vector as the difference vector connecting the first 3D position defined by the projection of the first pixel of the current video coding block of the current frame onto the viewing sphere with the second 3D position defined by the projection of the second pixel of the corresponding video coding block of the reference frame onto the viewing sphere.

This implementation form allows determining the 3D reference motion vector in a computationally efficient manner.

In a further implementation form of the first aspect, the inter prediction unit is configured to predict the at least one pixel of the current video coding block of the current frame on the basis of the 3D reference motion vector by: (i) selecting a further pixel from the corresponding video coding block of the reference frame; (ii) adding the 3D reference motion vector to a third 3D position defined by a projection of the further pixel from the corresponding video coding block of the reference frame onto the viewing sphere, to generate a fourth 3D position; and (iii) determining the two-dimensional position of the at least one pixel of the current video coding block by de-projecting the fourth 3D position onto the current frame.

This implementation form provides a computationally efficient motion compensation, because the same 3D reference motion vector can be used for different pixels of a current video coding block and, thus, has to be determined only once for each video coding block and after de-projecting on plane representation different pixels may have different motion vectors reflecting geometrical distortion caused by sphere-to-plane projection.

In a further implementation form of the first aspect, the inter prediction unit is configured to predict the at least one pixel of the current video coding block of the current frame on the basis of the 3D reference motion vector by: (i) selecting a further pixel from the corresponding video coding block of the reference frame; (ii) generating a modified 3D reference motion vector on the basis of the 3D reference motion vector, wherein the modified 3D reference motion vector and the 3D reference motion vector have the same length, but different orientations; (iii) adding the modified 3D reference motion vector to a third 3D position defined by a projection of the further pixel from the corresponding video coding block of the reference frame onto the viewing sphere, to generate a fourth 3D position; and (iv) determining the two-dimensional position of the at least one pixel of the current video coding block by de-projecting the fourth 3D position onto the current frame.

This implementation form provides improved motion compensation, because different pixels of the current video coding block can be predicted on the basis of different 3D reference motion vectors, namely a respective modified 3D reference motion vector.

In a further implementation form of the first aspect, the current frame defines an equatorial line corresponding to an equatorial plane of the viewing sphere and the inter prediction unit is configured to generate the modified 3D reference motion vector on the basis of the 3D reference motion vector by (i) determining a first great circle of the viewing sphere connecting the first 3D position defined by the projection of the first pixel of the current video coding block of the current frame onto the viewing sphere with the second 3D position defined by the projection of the second pixel of the corresponding video coding block of the reference frame onto the viewing sphere; (ii) determining a corresponding second great circle of the viewing sphere containing the third 3D position defined by the projection of the further pixel from the corresponding video coding block of the reference frame onto the viewing sphere, wherein the first great circle and the second great circle substantially intersect in the equatorial plane of the viewing sphere; (iii) determining the modified 3D motion vector as the difference vector connecting the third 3D position defined by the projection of the further pixel from the corresponding video coding block of the reference frame onto the viewing sphere and the fourth 3D position, wherein the fourth 3D position lies on the second great circle and wherein the distance between the fourth 3D position and the third 3D position is substantially equal to the distance between the first 3D position and the second 3D position. Differently put, wherein the fourth 3D position and the third 3D position define a portion of the second great circle having substantially the same length as a corresponding portion of the first great circle defined by the first 3D position and the second 3D position.

This implementation form allows determining the modified 3D reference motion vector in a computationally efficient manner.

In a further implementation form of the first aspect, the inter prediction unit is configured to predict a first subset of the plurality of pixels of the current video coding block of the current frame on the basis of the three-dimensional reference motion vector and a second subset of the plurality of pixels of the current video coding block of the current frame by interpolating the predicted first subset of the plurality of pixels, to generate the predicted video coding block for the current video coding block of the current frame on the basis of the corresponding video coding block of the reference frame.

This implementation form allows predicting pixels of a current video coding block in a computationally efficient manner by using interpolation of a set of pixels of the current video coding block already predicted on the basis of the 3D reference motion vector.

In a further implementation form of the first aspect, the encoding unit is further configured to encode the current video coding block of the current frame in combination with the 3D reference motion vector or a two-dimensional projection of the 3D reference motion vector.

This implementation form allows providing information about the 3D reference motion vector in an efficient manner to a corresponding decoding apparatus.

According to a second aspect the disclosure relates to a method for encoding a video signal, the video signal being a two-dimensional projection of a panoramic video signal and comprising a plurality of successive frames, including a reference frame and a current frame, each frame of the plurality of successive frames comprising a plurality of video coding blocks, each video coding block comprising a plurality of pixels, each pixel comprising at least one pixel value. The encoding method comprises: determining a 3D reference motion vector on the basis of a first 3D position defined by a projection of a first pixel of a current video coding block of the current frame onto a viewing sphere and a second 3D position defined by a projection of a second pixel of a corresponding video coding block of the reference frame onto the viewing sphere; predicting at least one pixel of the current video coding block of the current frame on the basis of the 3D reference motion vector, to generate a predicted video coding block for the current video coding block of the current frame on the basis of the corresponding video coding block of the reference frame; and encoding the current video coding block of the current frame on the basis of the predicted video coding block.

Thus, an improved method for encoding a panoramic video signal is provided, which allows encoding a panoramic video signal with an improved efficiency, as the 3D reference motion vector provides for a more efficient motion compensation.

According to a third aspect the disclosure relates to an apparatus for decoding an encoded video signal, the video signal being a two-dimensional projection of a panoramic video signal and comprising a plurality of successive frames, including a reference frame and a current frame, each frame of the plurality of successive frames comprising a plurality of video coding blocks, each video coding block comprising a plurality of pixels, each pixel comprising at least one pixel value. The decoding apparatus comprises: a decoding unit configured to decode the encoded video signal for providing a residual video coding block associated with a current video coding block of the current frame; an inter prediction unit configured to obtain a 3D reference motion vector based on a first 3D position defined by a projection of a first pixel of the current video coding block of the current frame onto a viewing sphere and a second 3D position defined by a projection of a second pixel of a corresponding video coding block of the reference frame onto the viewing sphere and to predict at least one pixel of the current video coding block of the current frame on the basis of the 3D reference motion vector, to generate a predicted video coding block for the current video coding block of the current frame on the basis of the corresponding video coding block of the reference frame; and a restoration unit configured to restore the current video coding block on the basis of the residual video coding block and the predicted video coding block.

Thus, an improved apparatus for decoding a panoramic video signal is provided, which allows decoding a panoramic video signal with an improved efficiency, as the 3D reference motion vector provides for a more efficient motion compensation.

In a further implementation form of the third aspect, the 3D reference motion vector is the difference vector connecting the first 3D position defined by the projection of the first pixel of the current video coding block of the current frame onto the viewing sphere with the second 3D position defined by the projection of the second pixel of the corresponding video coding block of the reference frame onto the viewing sphere.

In a further implementation form of the third aspect, the inter prediction unit is configured to predict the at least one pixel of the current video coding block of the current frame on the basis of the 3D reference motion vector by: (i) selecting a further pixel from the corresponding video coding block of the reference frame; (ii) adding the 3D reference motion vector to a third 3D position defined by a projection of the further pixel from the corresponding video coding block of the reference frame onto the viewing sphere to generate a fourth 3D position; and (iii) determining the two-dimensional position of the at least one pixel of the current video coding block by de-projecting the fourth 3D position onto the current frame.

This implementation form provides a computationally efficient motion compensation, because the same 3D reference motion vector can be used for different pixels of a current video coding block and, thus, has to be determined only once for each video coding block.

In a further implementation form of the third aspect, the inter prediction unit is configured to predict the at least one pixel of the current video coding block of the current frame on the basis of the 3D reference motion vector by: (i) selecting a further pixel from the corresponding video coding block of the reference frame; (ii) generating a modified 3D reference motion vector on the basis of the 3D reference motion vector, wherein the modified 3D reference motion vector and the 3D reference motion vector have the same length, but different orientations; (iii) adding the modified 3D reference motion vector to a third 3D position defined by a projection of the further pixel from the corresponding video coding block of the reference frame onto the viewing sphere, to generate a fourth 3D position; and (iv) determining the two-dimensional position of the at least one pixel of the current video coding block by de-projecting the fourth 3D position onto the current frame.

This implementation form provides improved motion compensation, because different pixels of the current video coding block can be predicted on the basis of different 3D reference motion vectors, namely a respective modified 3D reference motion vector.

In a further implementation form of the third aspect, the current frame defines an equatorial line corresponding to an equatorial plane of the viewing sphere and the inter prediction unit is configured to generate the modified 3D reference motion vector on the basis of the 3D reference motion vector by (i) determining a first great circle of the viewing sphere connecting the first 3D position defined by the projection of the first pixel of the current video coding block of the current frame onto the viewing sphere with the second 3D position defined by the projection of the second pixel of the corresponding video coding block of the reference frame onto the viewing sphere; (ii) determining a corresponding second great circle of the viewing sphere containing the third 3D position defined by the projection of the further pixel from the corresponding video coding block of the reference frame onto the viewing sphere, wherein the first great circle and the second great circle substantially intersect in the equatorial plane of the viewing sphere; (iii) determining the modified 3D motion vector as the difference vector connecting the third 3D position defined by the projection of the further pixel from the corresponding video coding block of the reference frame onto the viewing sphere and the fourth 3D position, wherein the fourth 3D position lies on the second great circle and wherein the distance between the fourth 3D position and the third 3D position is substantially equal to the distance between the first 3D position and the second 3D position. Differently put, wherein the fourth 3D position and the third 3D position define a portion of the second great circle having substantially the same length as a corresponding portion of the first great circle defined by the first 3D position and the second 3D position.

This implementation form allows determining the modified 3D reference motion vector in a computationally efficient manner.

In a further implementation form of the third aspect, the inter prediction unit is configured to predict a first subset of the plurality of pixels of the current video coding block of the current frame on the basis of the 3D reference motion vector and a second subset of the plurality of pixels of the current video coding block of the current frame by interpolating the predicted first subset of the plurality of pixels, to generate the predicted video coding block for the current video coding block of the current frame on the basis of the corresponding video coding block of the reference frame.

This implementation form allows predicting pixels of a current video coding block in a computationally efficient manner by using interpolation of a set of pixels of the current video coding block already predicted on the basis of the 3D reference motion vector.

In a further implementation form of the third aspect, the inter-prediction unit is configured to obtain the 3D reference motion vector and/or a two-dimensional projection of the 3D reference motion vector by extracting the 3D reference motion vector and/or a two-dimensional projection of the 3D reference motion vector from the encoded video signal.

This implementation form allows obtaining information about the 3D reference motion vector in an efficient manner.

According to a fourth aspect the disclosure relates to a method for decoding an encoded video signal, the video signal being a two-dimensional projection of a panoramic video signal and comprising a plurality of successive frames, including a reference frame and a current frame, each frame of the plurality of successive frames comprising a plurality of video coding blocks, each video coding block comprising a plurality of pixels, each pixel comprising at least one pixel value. The decoding method comprises: decoding the encoded video signal for providing a residual video coding block associated with a current video coding block of the current frame; obtaining a 3D reference motion vector based on a first 3D position defined by a projection of a first pixel of the current video coding block of the current frame onto a viewing sphere and a second 3D position defined by a projection of a second pixel of a corresponding video coding block of the reference frame onto the viewing sphere; predicting at least one pixel of the current video coding block of the current frame on the basis of the 3D reference motion vector to generate a predicted video coding block for the current video coding block of the current frame on the basis of the corresponding video coding block of the reference frame; and restoring the current video coding block on the basis of the residual video coding block and the predicted video coding block.

Thus, an improved method for decoding a panoramic video signal is provided, which allows decoding a panoramic video signal with an improved efficiency, as the 3D reference motion vector provides for a more efficient motion compensation.

According to a fifth aspect the disclosure relates to a computer program comprising program code for performing the method according to the second or fourth aspect when executed on a computer.

The disclosure can be implemented in hardware and/or software.

Thus, embodiments of the disclosure, in order to obtain curved motion trajectories and corresponding displacement vectors, make use of the fact that motion along a straight line in a panoramic video scene is projected onto a viewing sphere as motion along a geodesic. It is known from geometry that a geodesic is a projection of a straight line on the viewing sphere. More specifically, a geodesic is a portion of a great circle, i.e. an intersection of the viewing sphere and a plane which passes through the center point of the sphere.

Generally, there can be an infinite number of lines (or to be more precise, part of circles or arcs) that pass through two points on a sphere. However, only one of them is lying on a great circle. Once the positions of two points on a viewing sphere are known, there is only one geodesic and, thus, only one great circle passing through these two points. Parameters of curvature of this geodesic in a two-dimensional projection, such as the equirectangular projection, can be completely defined by these two points and derived without explicit signaling. The first point can be a point of a video coding block that needs to be predicted, e.g., at the top-left corner. By knowing the displacement or motion vector signaled or derived for the current block, the second point can also be defined. Thus, one displacement vector together with a block position on a picture allows defining the complete parameters of the geodesic.

In summary, embodiments of the disclosure allow adjusting the prediction mechanism to the geometry on the viewing sphere and a further sphere-to-2D projection (e.g., to equirectangular projection); reducing the amount of residuals that need to be coded for a better prediction; and obtaining complex block transformation reflecting motion on the viewing sphere and on the unrolled 2D projection with use of only one motion vector.

Embodiments of the disclosure take into account the projection of a real three-dimensional (3D) scene onto a viewing sphere to improve motion compensation for spherical videos unfolded to a two-dimensional (2D) projection (e.g., equirectangular or cubic map). When an object moves in 3D space, all pixels of this object have the same motion vector in 3D space. But, after projection of the 3D scene onto the viewing sphere and further unfolding of the viewing sphere onto a flat plane (or onto several flat segments, e.g., the surfaces of a cube), motion vectors of pixels of the same block become different. As will be described in more detail further below, embodiments of the disclosure allow deriving different motion vectors for different pixels of a block using just one transmitted motion vector for this block.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the disclosure. The following detailed description, therefore, is not to be taken in a limiting sense, as the scope of the disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
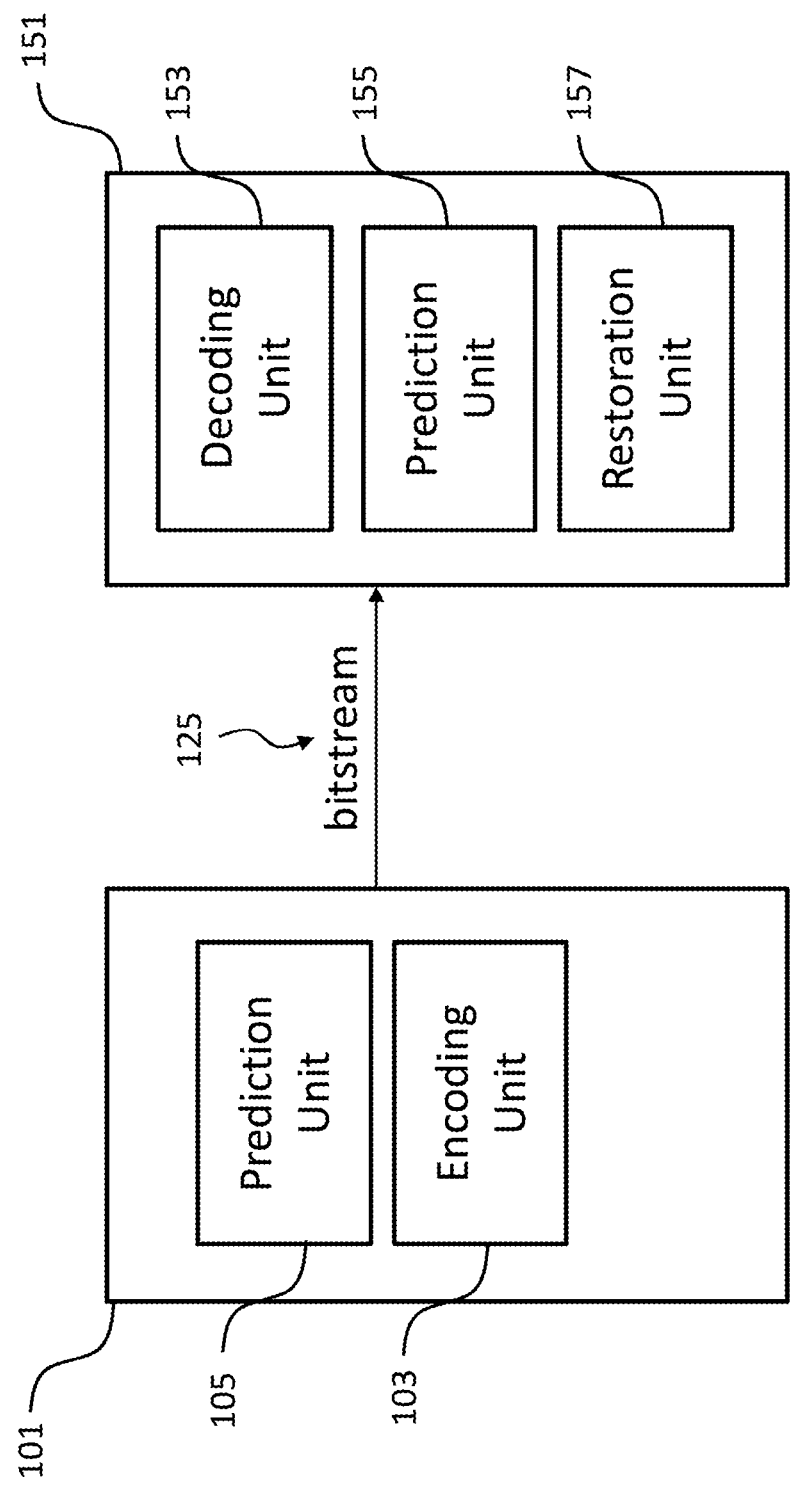
FIG. 1 shows a schematic diagram illustrating an encoding apparatus according to an embodiment and a decoding apparatus according to an embodiment.

FIG. 1 shows a schematic diagram illustrating an encoding apparatus 101 for encoding a video signal according to an embodiment and a decoding apparatus 151 for decoding an encoded video signal according to an embodiment. The video signal is a two-dimensional projection of a panoramic video signal, such as a 360° video signal, and comprises a plurality of successive frames, including a reference frame 405 and a current frame 403 (shown, for instance, in FIG. 4). Each frame of the plurality of successive frames comprises a plurality of video coding blocks and each video coding block comprises a plurality of pixels (as will be appreciated, each pixel, generally, comprises at least one or more pixel values, such as RGB or YUV values).

The encoding apparatus 101 comprises an inter prediction unit 105 configured to determine a 3D reference motion vector on the basis of a first 3D position defined by a projection of a first pixel of a current video coding block 401 (shown in FIG. 4) of the current frame 403 onto a viewing sphere 501 (shown in FIG. 5) and a second 3D position defined by a projection of a second pixel of a corresponding video coding block of the reference frame 405 onto the viewing sphere 501, as will be described in more detail further below. Moreover, the inter prediction unit 105 is configured to predict further pixels of the current video coding block 401 of the current frame 403 on the basis of the 3D reference motion vector to generate a predicted video coding block for the current video coding block 401 of the current frame 403 on the basis of the corresponding video coding block of the reference frame 405.

The encoding apparatus 101 further comprises an encoding unit 103 configured to encode the current video coding block 401 of the current frame 403 on the basis of the predicted video coding block, for instance, as part of the encoded bitstream 125.

In an embodiment, the encoding apparatus 101 can be implemented as a hybrid encoder, as defined, for instance, in the HEVC standard, and comprise further components not shown in FIG. 1. Such an embodiment will be described further below in the context of FIG. 2.

The decoding apparatus 151 comprises a decoding unit 153 configured to decode the encoded video signal for providing a residual video coding block associated with a current video coding block 401 of the current frame 403.

The decoding apparatus 151 further comprises an inter prediction unit 155 configured to obtain the 3D reference motion vector based on the first 3D position defined by the projection of the first pixel of the current video coding block 401 of the current frame 403 onto the viewing sphere 501 and the second 3D position defined by the projection of the second pixel of the corresponding video coding block of the reference frame 405 onto the viewing sphere 501, as will be described in more detail further below. Moreover, the prediction unit 155 is configured to predict at least one pixel of the current video coding block 401 of the current frame 403 on the basis of the 3D reference motion vector to generate a predicted video coding block for the current video coding block 401 of the current frame 403 on the basis of the corresponding video coding block of the reference frame 405.

The decoding apparatus 151 further comprises a restoration unit 157 configured to restore the current video coding block 401 on the basis of the residual video coding block and the predicted video coding block. In an embodiment, the restoration unit 157 can be a summation unit configured to generate the sum of the residual video coding block and the predicted video coding block.

As will be appreciated, at the decoding side, information about the prediction type or/and prediction parameters can be extracted from the encoded bitstream 125, wherein a prediction block can be generated according to this information. Then residual coefficients of the currently processed video coding block 401, i.e. the residual video coding block, of a current frame 403 of the panoramic video signal can be extracted from the bitstream 125, inverse quantized, transformed, and added to the prediction block to get a reconstructed block. Once a full frame is reconstructed, it can go through loop filters to be output or stored in reference picture buffer for future inter-frame prediction. Thus, in an embodiment, the decoding apparatus 151 can be implemented as a hybrid decoder, as defined, for instance, in the HEVC standard, and comprise further components not shown in FIG. 1. Such an embodiment will be described in more detail further below in the context of FIG. 3.

In an embodiment, the inter prediction units 105, 155 can be configured to predict a first subset of the plurality of pixels of the current video coding block 401 of the current frame 403 on the basis of the 3D reference motion vector and a second subset of the plurality of pixels of the current video coding block 401 of the current frame 403 by interpolating the predicted first subset of the plurality of pixels to generate the predicted video coding block for the current video coding block 401 of the current frame 403 on the basis of the corresponding video coding block of the reference frame 405.

In an embodiment, the encoding unit 103 of the encoding apparatus 101 is further configured to encode the current video coding block 401 of the current frame 403 in combination with the 3D reference motion vector or a two-dimensional projection thereof in the encoded bitstream 125.

In an embodiment, the inter-prediction unit 155 and/or the decoding unit 153 of the decoding apparatus is configured to obtain the 3D reference motion vector and/or a two-dimensional projection thereof by extracting the 3D reference motion vector and/or a two-dimensional projection thereof from the encoded bitstream 125.

Figure 2:
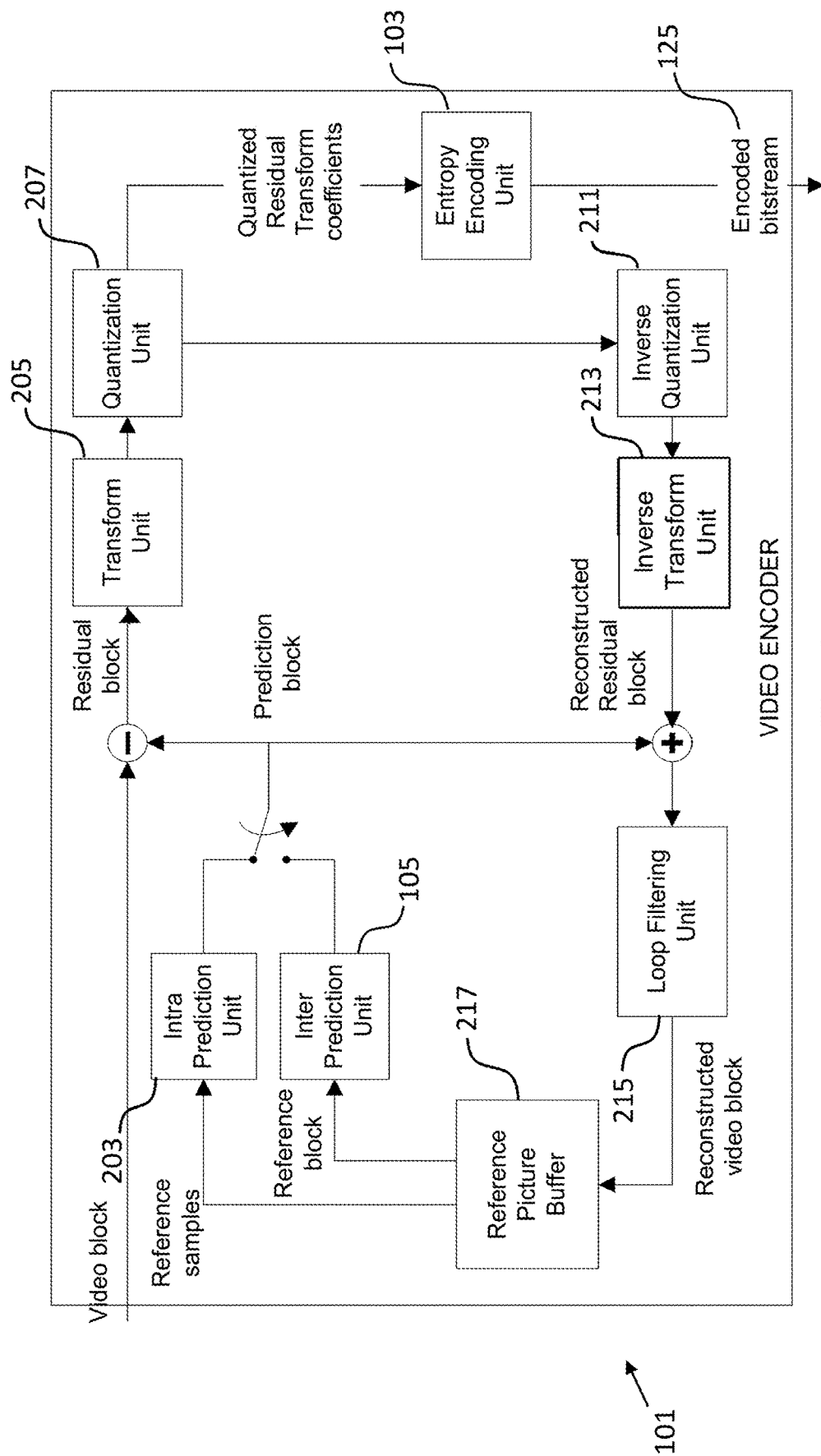
FIG. 2 shows a schematic diagram illustrating a hybrid encoding apparatus according to an embodiment.

As already mentioned above, the encoding apparatus 101 can be implemented as a hybrid encoder as defined, for instance, in the HEVC standard. FIG. 2 shows an embodiment of the encoding apparatus 101 as a hybrid encoder that includes inter-picture prediction, intra-picture prediction and 2D transform coding, which is similar to the approach employed by the state-of-the-art video codec (e.g., H.265/HEVC). The embodiment of the encoding apparatus 101 shown in FIG. 2 operates in the following way. For intra-picture prediction implemented in block 203 of FIG. 2, the prediction of a block of a frame is based only on the information in that frame by using directional, planar or DC prediction modes. On the other hand, inter-picture prediction (or short "inter prediction"), as implemented in embodiments of the disclosure, uses information from previously transmitted reference frames. After the prediction for each currently processed video coding block 401 of a current frame 403, the predictor block, i.e. the predicted current video coding block, is subtracted for providing a residual video coding block. The predicted residual block is then transformed to a frequency domain by a transform unit 205 and then quantized by a quantization unit 207. To obtain reference for future inter-prediction, the frame is reconstructed using an inverse quantization unit 211 as well as a inverse transform unit 213 and goes through the loop filtering unit 215. The final picture representation is stored in the reference picture buffer 217.

Figure 3:
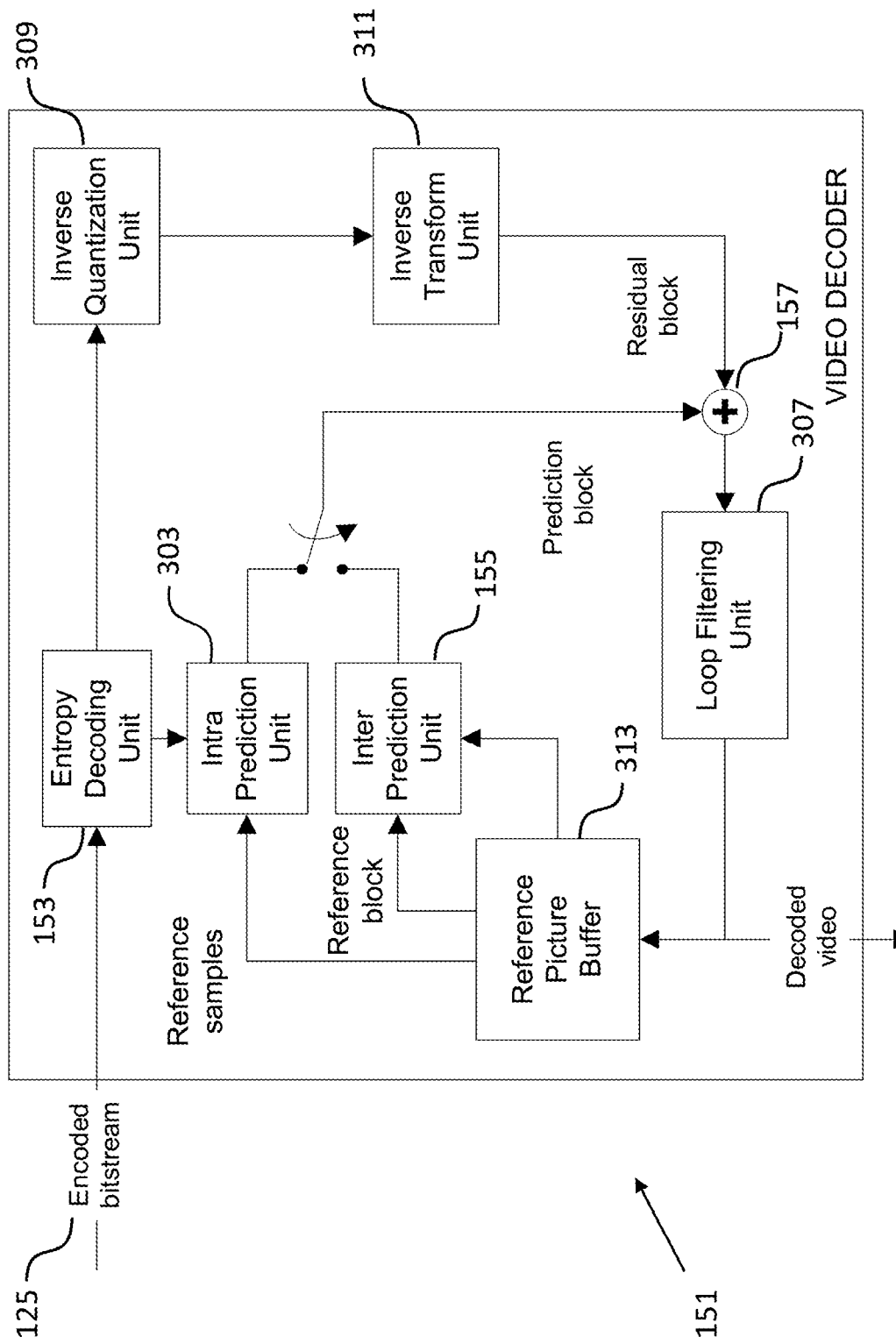
FIG. 3 shows a schematic diagram illustrating a hybrid decoding apparatus according to an embodiment.

Likewise, the decoding apparatus 151 can be implemented as a hybrid decoder as defined, for instance, in the HEVC standard. FIG. 3 shows an embodiment of the decoding apparatus 151 as a hybrid decoder.

As seen in FIG. 3, residuals of a currently processed video coding block 401, i.e. the residual video coding block, of a current frame 401 of the panoramic video signal are extracted from the encoded bitstream 125 and read by the entropy decoding unit 153 together with the corresponding parameters for inter and intra prediction. The residual video coding block is processed by the inverse transformation unit 311 and the inverse quantization unit 309, and added to the predicted video coding block by the restoration unit 157 to generate the reconstructed video coding block. The reconstructed video coding block can be provided to an intra prediction unit 303 for intra prediction of other video coding blocks of the same frame. Moreover, the reconstructed video coding block can be loop filtered by a loop filter 307 and stored in a reference picture buffer 313. At this stage the reconstructed video coding block is also available for inter prediction of video coding blocks of other frames by means of the inter prediction unit 155, as implemented in embodiments of the disclosure, which will be described in more detail in the following.

Figure 4:
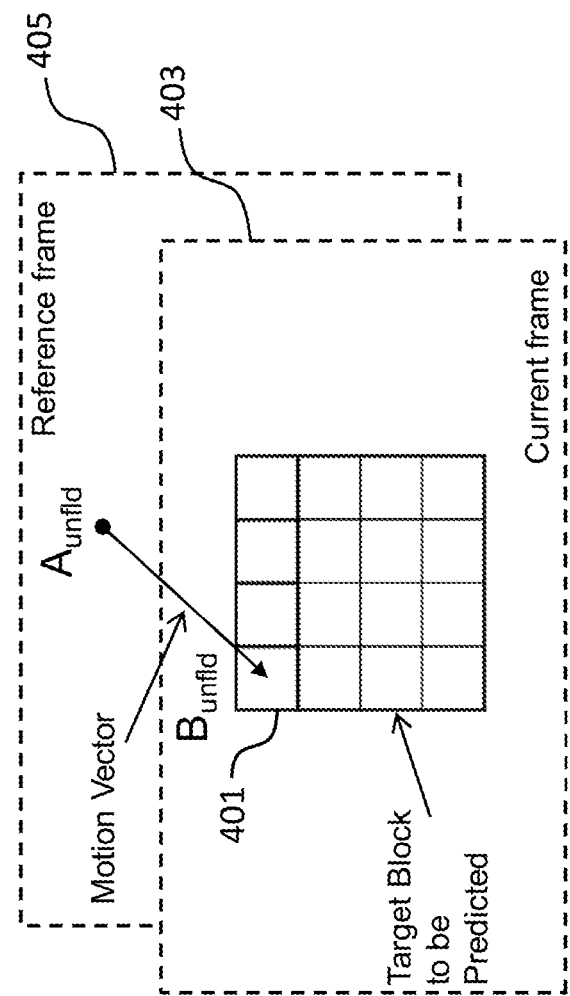
FIG. 4 shows a schematic diagram illustrating a current frame and a reference frame of a video signal as used by an encoding apparatus or a decoding apparatus according to an embodiment.

FIG. 4 shows a schematic diagram illustrating a current frame 403 and a reference frame 405 of a video signal as used by the encoding apparatus 101 and the decoding apparatus 151 according to an embodiment. Assuming that a motion vector is known for a pixel of the current block 401, e.g., the top-left pixel $B_{unfld}$ as shown in FIG. 4, which can be explicitly signaled or derived on the decoder side and using this motion vector, the coordinate of the pixel $A_{unfld}$ can be derived. The coordinates of the pixels $A_{unfld}$ and $B_{unfld}$ can be converted to the spherical domain, and by the corresponding pixels $A_{sph}$ and $B_{sph}$ on the viewing sphere 501, a 3D reference motion vector in 3D space can be calculated, as shown in FIG. 5.

Figure 5:
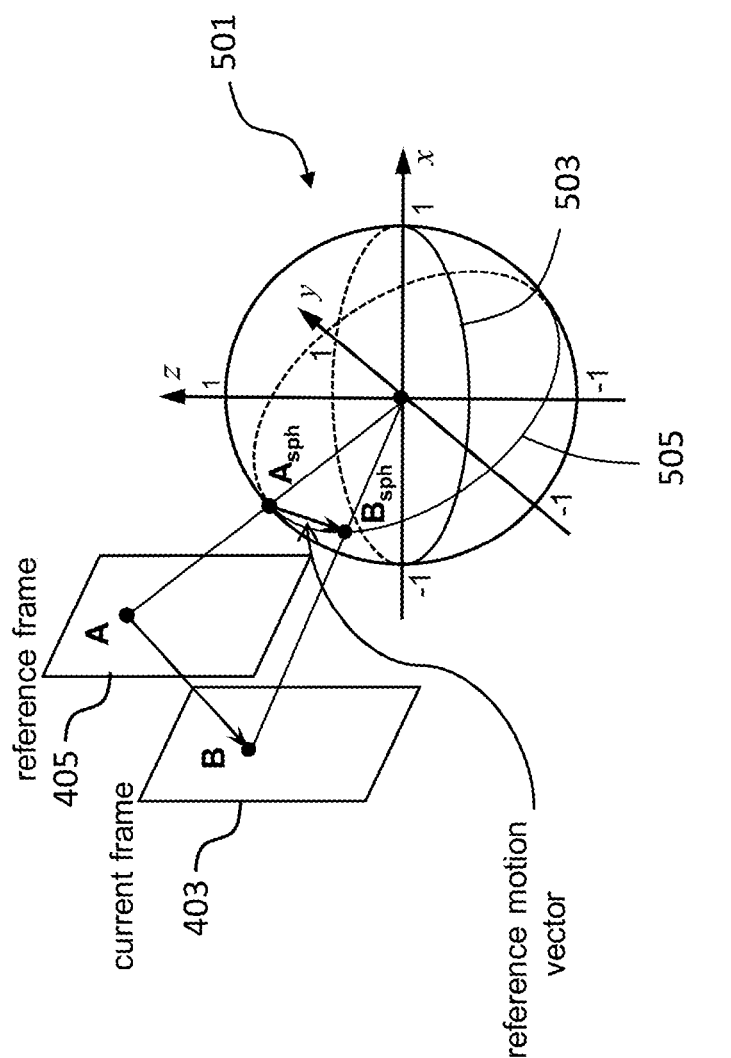
FIG. 5 shows a schematic diagram illustrating a 3D reference motion vector in combination with a viewing sphere as used by an encoding apparatus or a decoding apparatus according to an embodiment.

FIG. 5 shows a schematic diagram illustrating how to determine a 3D reference motion vector on a viewing sphere 501 according to an embodiment. As can be seen in FIG. 5, point A moves in three-dimensional (3D) space along a straight line to point B. After projection onto the viewing sphere 501, a straight motion trajectory between points A and B becomes a curved line along a geodesic between points $A_{sph}$ and $B_{sph}$ on the viewing sphere 501, wherein the vector between $A_{sph}$ and $B_{sph}$ in 3D space is denoted herein as the 3D reference motion vector. This 3D reference motion vector can easily be derived by spherical geometry equations (e.g., by tunnel distance formula) from known spherical coordinates of two points.

Thus, in an embodiment, the inter prediction unit 105 of the encoding apparatus 101 is configured to determine the 3D reference motion vector as the difference vector connecting the first 3D position $A_{sph}$ defined by the projection of a first pixel A of the current video coding block 401 of the current frame 403 onto the viewing sphere 501 with the second 3D position $B_{sph}$ defined by the projection of the second pixel B of the corresponding video coding block of the reference frame 405 onto the viewing sphere 501.

Figure 6:
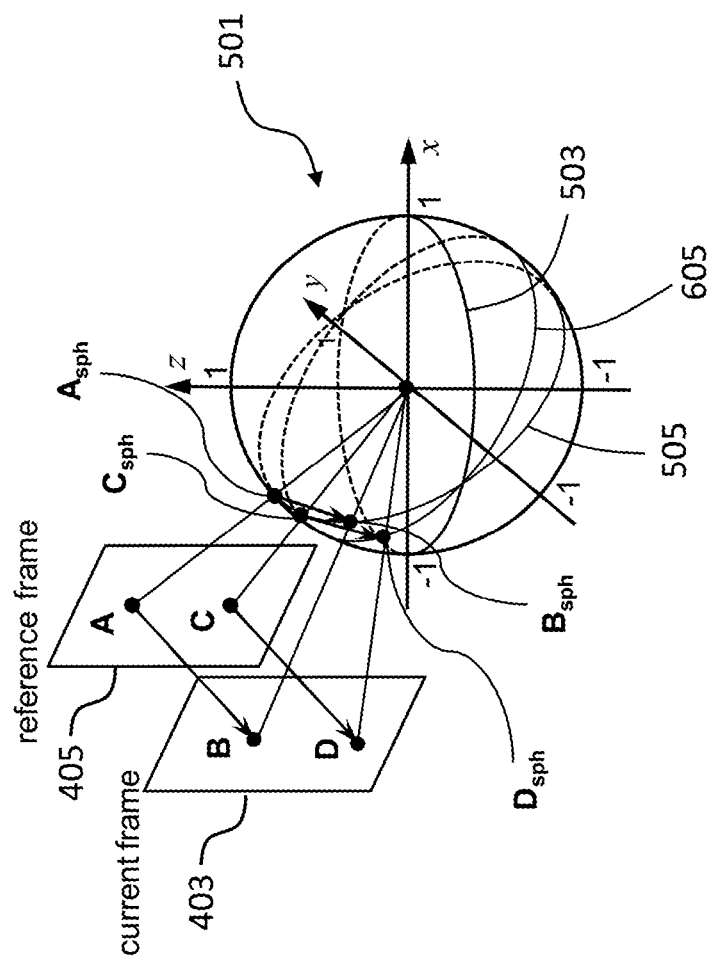
FIG. 6 shows a schematic diagram illustrating a modified 3D reference motion vector in combination with a viewing sphere as used by an encoding apparatus or a decoding apparatus according to an embodiment.

FIG. 6 shows a schematic diagram illustrating how to determine a pixel position on a viewing sphere 501 based on a 3D reference motion vector according to an embodiment. Consider another point C moving toward the point D in 3D space. Points C and D are projected onto the viewing sphere 501 as $C_{sph}$, $D_{sph}$ correspondingly, as seen in FIG. 6. According to an embodiment, all points in the current block 401 can have the same 3D reference motion vector in 3D space of original scene. Particularly, the coordinates of point $D_{unfld}$ and corresponding point $D_{sph}$ are known from the current block position. The 3D reference motion vector between $A_{sph}$ and $B_{sph}$ can be derived as described above. According to embodiments of the disclosure, the vector ($A_{sph}$, $B_{sph}$) can be equal to the vector ($C_{sph}$, $D_{sph}$), which allows deriving the point $C_{sph}$ and the corresponding point $C_{unfld}$, wherein the point $C_{unfld}$ denotes the coordinate of the reference pixel for point $D_{unfld}$ in the reference frame 405. Repeating this procedure for all pixels of the current block 401 can successfully perform inter-prediction for the entire block 401.

Thus, in an embodiment, the inter prediction unit 105 is configured to predict at least one pixel D of the current video coding block 401 of the current frame 403 on the basis of the 3D reference motion vector by: (i) selecting a further pixel C from the corresponding video coding block of the reference frame 405; (ii) adding the 3D reference motion vector to a third 3D position $C_{sph}$ defined by a projection of the further pixel C from the corresponding video coding block of the reference frame 405 onto the viewing sphere 501 to generate a fourth 3D position $D_{sph}$; and (iii) determining the two-dimensional position of the at least one pixel D of the current video coding block 401 by de-projecting the fourth 3D position $D_{sph}$ onto the current frame 403.

Figure 7:
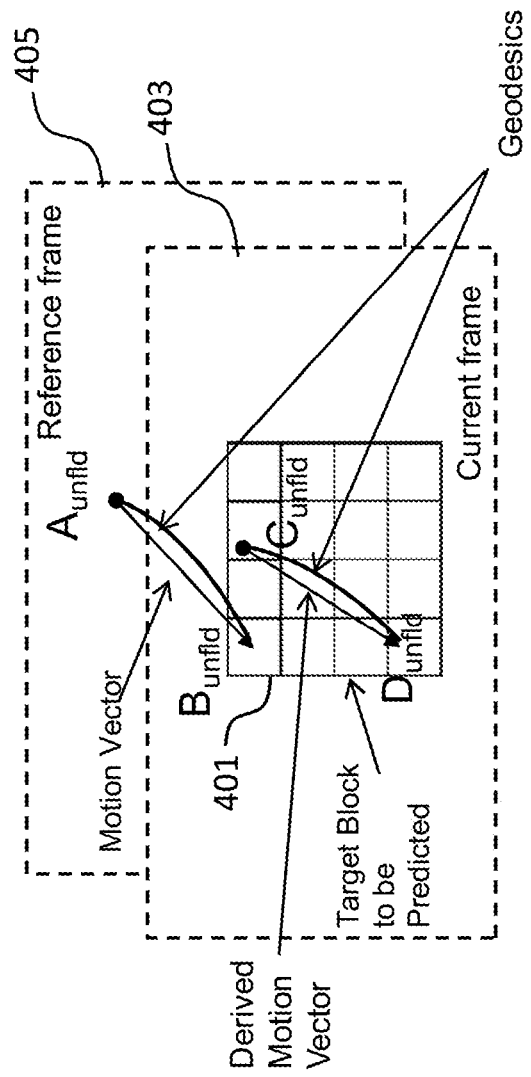
FIG. 7 shows a schematic diagram illustrating motion compensation based on a 3D reference motion vector as used by an encoding apparatus or a decoding apparatus according to an embodiment.

FIG. 7 shows a schematic diagram illustrating how to perform motion compensation based on a 3D reference motion vector according to an embodiment. Spherical coordinates can be obtained from the coordinates $A_{unfld}$ and $B_{unfld}$ on the unfolded image using a backward 2D-to-spherical projection that is used to obtain 2D images from spherical videos for encoding, as shown in FIG. 7.

According to an embodiment, each point in the current block 401 can have a 3D motion vector with the same length as the 3D reference motion vectors in the 3D space of the original scene. The vectors A, B and C, D shown in FIG. 6 are parts of straight parallel lines in 3D space. According to spherical geometry they are projected onto the viewing sphere 501 as geodesics, i.e. portion of great circles, crossing at some points, as can be seen in FIG. 6. Once the positions of $A_{sph}$ and $B_{sph}$ are known, a geodesic 505 on the viewing sphere 501 can be drawn through these two points for deriving geodesic parameters. By using at least one of these parameters, a great circle 605 passing through point $D_{sph}$ can be drawn, wherein point $C_{sph}$ lies on the same great circle 605. Based on the fact that the lengths of the vectors $A_{sph}$, $B_{sph}$ and $C_{sph}$, $D_{sph}$ are equal, the exact position $C_{sph}$ can be found and, thus, the position of $C_{unfld}$ can be derived. As can be seen in FIG. 7, the position of $C_{unfld}$ is the reference position for point $D_{unfld}$. Repeating this procedure for all pixels of the current block 401 can successfully perform inter-prediction for the entire block 401.

Thus, in an embodiment, the inter prediction unit 105 is configured to predict the at least one pixel of the current video coding block 401 of the current frame 403 on the basis of the 3D reference motion vector by: (i) selecting a further pixel C from the corresponding video coding block of the reference frame 405; (ii) generating a modified 3D reference motion vector on the basis of the 3D reference motion vector, wherein the modified 3D reference motion vector and the 3D reference motion vector have the same length, but different orientations; (iii) adding the modified 3D reference motion vector to a third 3D position $C_{sph}$ defined by a projection of the further pixel C from the corresponding video coding block of the reference frame 405 onto the viewing sphere 501 to generate a fourth 3D position $D_{sph}$; and (iv) determining the two-dimensional position of the at least one pixel D of the current video coding block 401 by de-projecting the fourth 3D position $D_{sph}$ onto the current frame 403.

As the current frame 403 is part of a panoramic video signal, it defines an equatorial line corresponding to an equatorial plane 503 of the viewing sphere 501. The equatorial or horizontal plane 503 defines the plane having an elevation angle equal to zero relative to the viewing sphere 501. In an embodiment, the inter prediction unit 105 is configured to generate the modified 3D reference motion vector on the basis of the 3D reference motion vector by (i) determining a first great circle 505 of the viewing sphere 501 (shown in FIGS. 5 and 6) connecting the first 3D position $A_{sph}$ defined by the projection of the first pixel of the current video coding block 401 of the current frame 403 onto the viewing sphere 501 with the second 3D position $B_{sph}$ defined by the projection of the second pixel of the corresponding video coding block of the reference frame 405 onto the viewing sphere 501; (ii) determining a corresponding second great circle 605 (shown in FIG. 6) of the viewing sphere 501 containing the third 3D position $C_{sph}$ defined by a projection of the further pixel C from the corresponding video coding block of the reference frame 405 onto the viewing sphere 501, wherein the first great circle 505 and the second great circle 605 substantially intersect in the equatorial plane 503 of the viewing sphere 501; (iii) determining the modified 3D motion vector as the difference vector connecting the third 3D position $C_{sph}$ defined by the projection of the further pixel C from the corresponding video coding block of the reference frame 405 onto the viewing sphere 501 and a fourth 3D position $D_{sph}$, wherein the fourth 3D position $D_{sph}$ lies on the second great circle 605 and wherein the distance between the fourth 3D position $D_{sph}$ and the third 3D position $C_{sph}$ is substantially equal to the distance between the first 3D position $A_{sph}$ and the second 3D position $B_{sph}$. In other words, the fourth 3D position $D_{sph}$ and the third 3D position $C_{sph}$ define a portion of the second great circle 605, i.e. a geodesic, having substantially the same length as a corresponding portion of the first great circle defined by the first 3D position $A_{sph}$ and the second 3D position $B_{sph}$.

Figure 8:
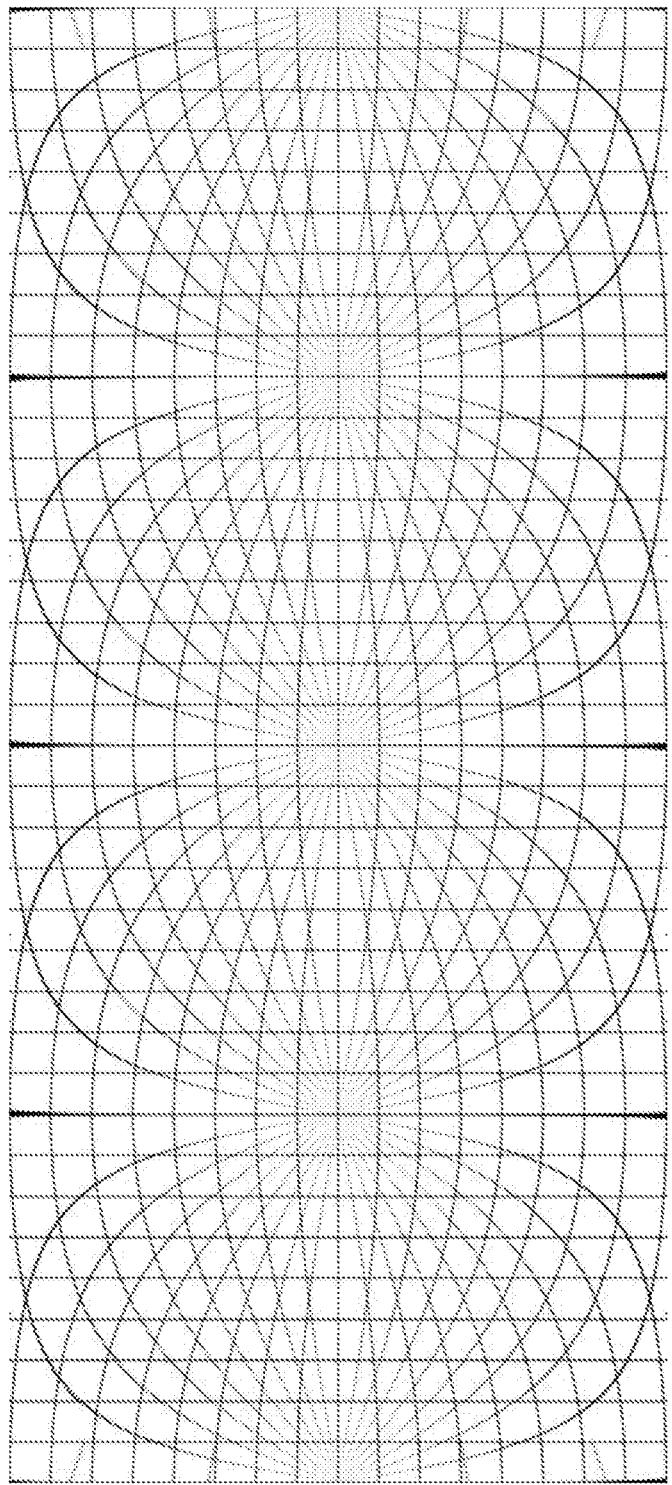
FIG. 8 shows a schematic diagram illustrating great circles in equirectangular projection.

FIG. 8 shows a schematic diagram illustrating exemplary great circles evenly spaced 10 degrees after being unfolded from a sphere to a plane by an equirectangular projection, which according to an embodiment can be implemented in the encoding apparatus 101 and/or the decoding apparatus. As can be seen from the equirectangular-projected image, straight lines become distorted, and motion along straight lines in a three-dimensional (3D) sphere will also be viewed as motion along these curves.

Figure 9:
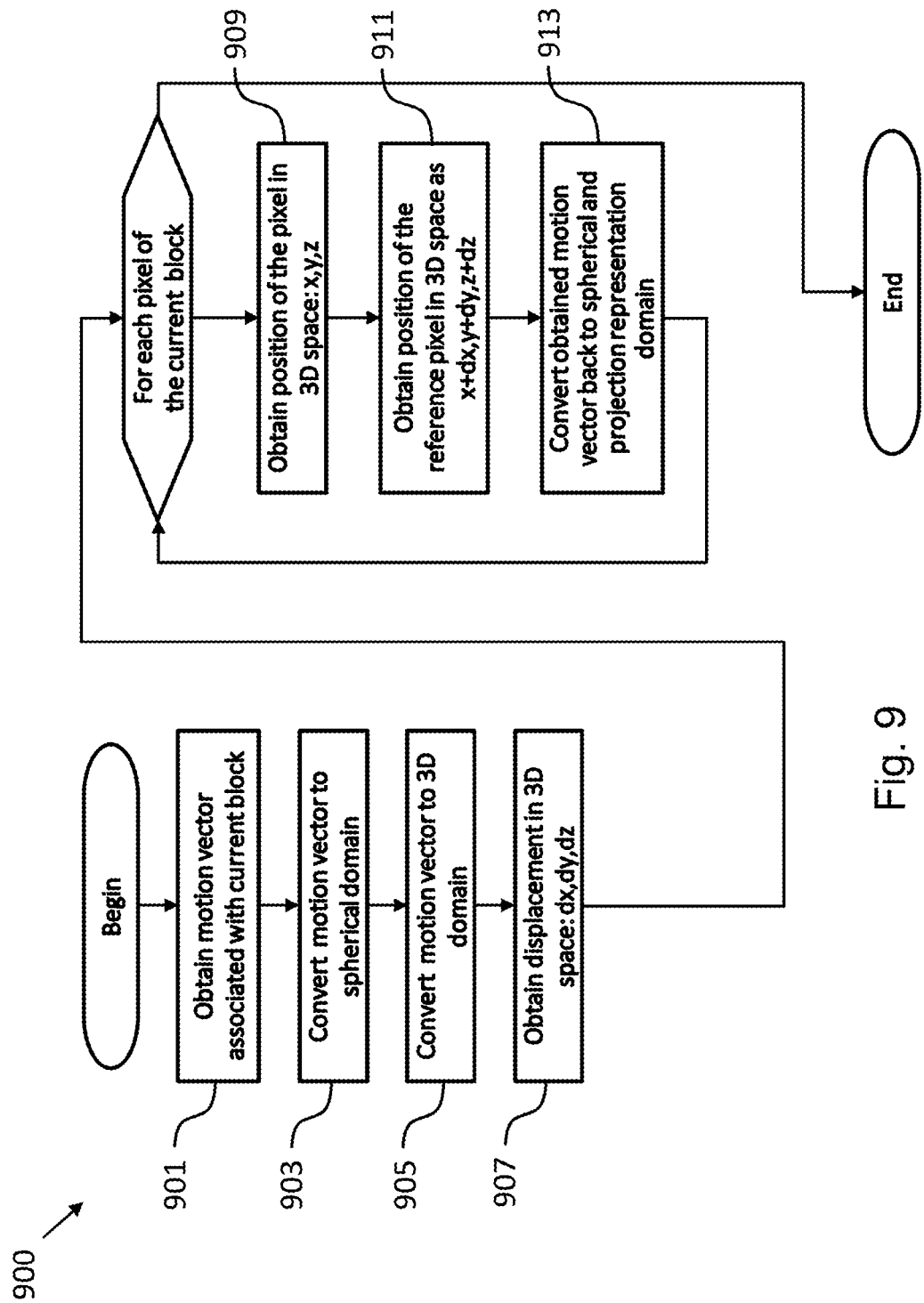
FIG. 9 shows a diagram illustrating a procedure for predicting at least one pixel of a current video coding block of a current frame of a panoramic video signal implemented in an encoding apparatus or a decoding apparatus according to an embodiment.

FIG. 9 shows a diagram illustrating summarizing the procedure for predicting at least one pixel of a current video coding block of a current frame 403 of a panoramic video signal implemented in the encoding apparatus 101 and/or the decoding apparatus 151 according to an embodiment. The procedure 900 shown in FIG. 9 comprises the following steps.

First, the inter prediction unit 105, 155 is configured to obtain a two-dimensional reference motion vector associated with a current block 401 (step 901).

The two-dimensional reference motion vector is converted to a reference motion vector in the spherical domain (step 903).

The reference motion vector in the spherical domain is converted to a 3D reference motion vector in the 3D domain (step 905).

A displacement of the 3D reference motion vector in the 3D domain is obtained (step 907). For each pixel of the current block 401, a position of the each pixel in 3D space is obtained (step 909).

For each pixel of the current block 401, a position of a reference pixel of a reference frame 405 for the each pixel of the current block 401 of the current frame 403 in 3D space is obtained (step 911).

For each pixel of the current block 401, the 3D reference motion vector of each pixel in 3D space is converted to a motion vector in the spherical domain and a motion vector in a projection representation domain (step 913).

Figure 10:
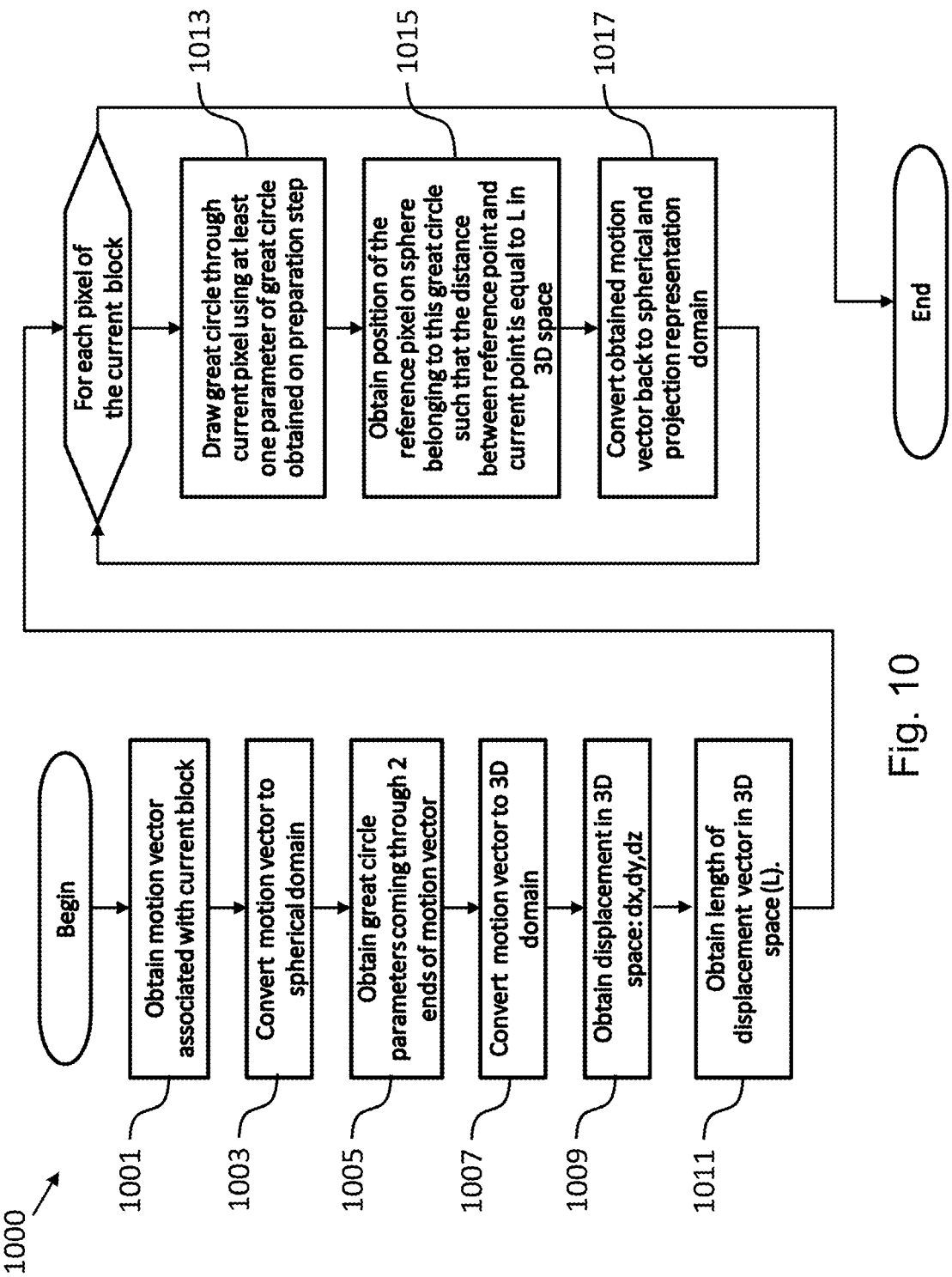
FIG. 10 shows a diagram illustrating a procedure for predicting at least one pixel of a current video coding block of a current frame of a panoramic video signal implemented in an encoding apparatus or a decoding apparatus according to an embodiment.

FIG. 10 shows a diagram summarizing the procedure for predicting at least one pixel of a current video coding block of a current frame 403 of a panoramic video signal implemented in the encoding apparatus 101 and/or the decoding apparatus 151 according to an embodiment. The procedure 1000 shown in FIG. 10 comprises the following steps.

First, the inter prediction unit 105, 155 is configured to obtain a two-dimensional reference motion vector associated with a current block 401 (step 1001).

The two-dimensional reference motion vector is converted to a reference motion vector in the spherical domain (step 1003).

Parameters of the great circle 505 passing through two ends of the reference motion vector in the spherical domain are derived (step 1005).

The reference motion vector in the spherical domain is converted to a 3D reference motion vector in the 3D domain (step 1007).

A displacement of the 3D reference motion vector in the 3D domain is obtained (step 1009).

A length of the displacement of the 3D reference motion vector in the 3D domain is obtained (step 1011).

For each pixel of the current block 401, a second great circle 605 passing through each current pixel is obtained by use of at least one parameter of the previous great circle 505 (step 1013).

For each pixel of the current block 401, a position of a reference pixel of a reference frame 405 for the each pixel of the current block 401 of the current frame 403 in the spherical domain is obtained, such that the position of the reference pixel passes through the second great circle 605 and the distance between the each pixel of the current block 401 and the reference pixel of the reference block in 3D space is equal to the length of the displacement of the 3D reference motion vector in the 3D domain (step 1015).

For each pixel of the current block 401, the motion vector of the each pixel in 3D space is converted to a motion vector in spherical domain and a motion vector in a projection representation domain (step 1017).

Figure 11:
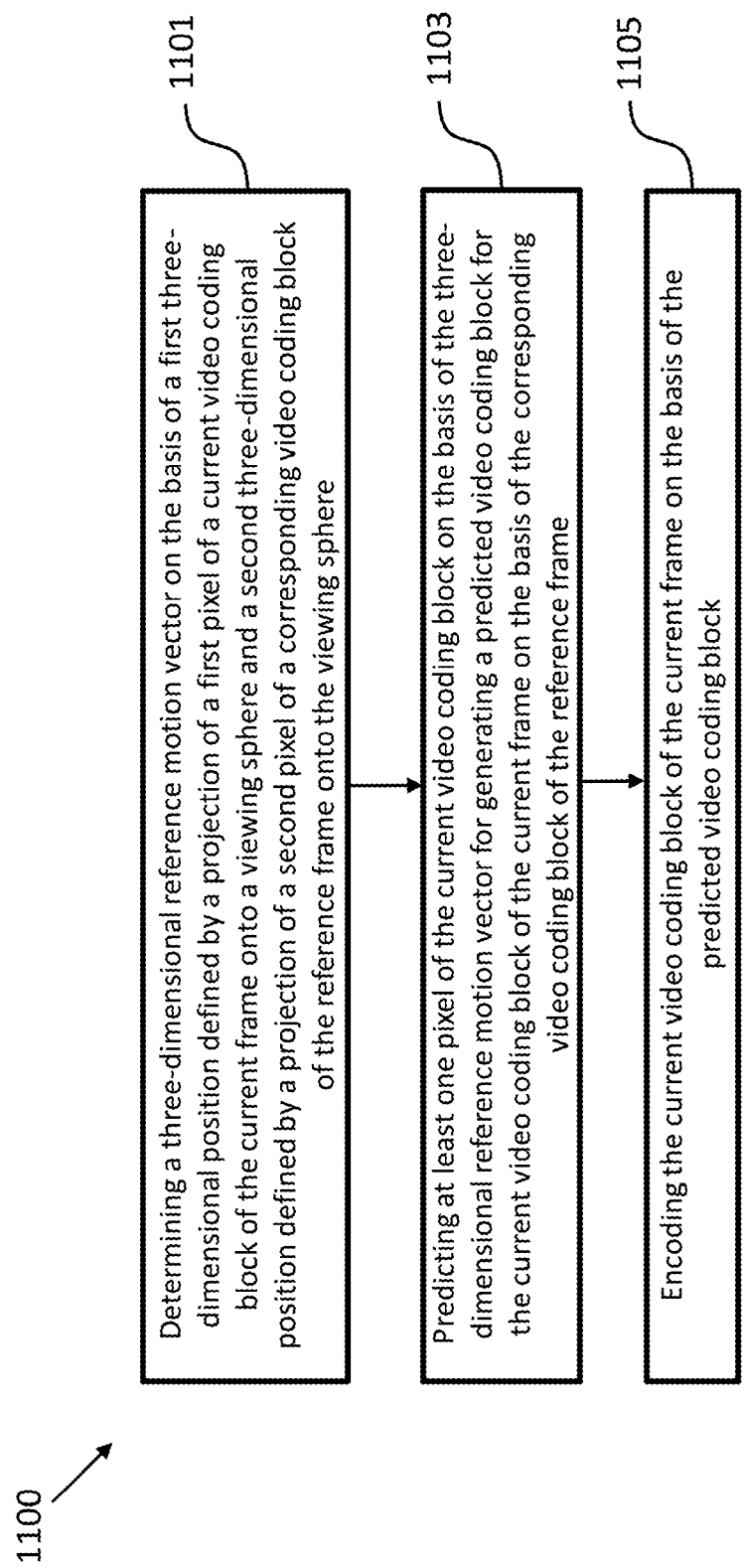
FIG. 11 shows a schematic diagram illustrating a method for encoding a video signal according to an embodiment.

FIG. 11 shows a schematic diagram illustrating a method 1100 for encoding a video signal according to an embodiment. The encoding method 1100 comprises the following steps: determining 1101 a 3D reference motion vector on the basis of a first 3D position defined by a projection of a first pixel of a current video coding block 401 of the current frame 403 onto a viewing sphere 501 and a second 3D position defined by a projection of a second pixel of a corresponding video coding block of the reference frame 405 onto the viewing sphere 501; predicting 1103 at least one pixel of the current video coding block 401 of the current frame 403 on the basis of the 3D reference motion vector to generate a predicted video coding block for the current video coding block 401 of the current frame 403 on the basis of the video coding block of the reference frame 405; and encoding 1105 the current video coding block 401 of the current frame 403 on the basis of the predicted video coding block.

Figure 12:
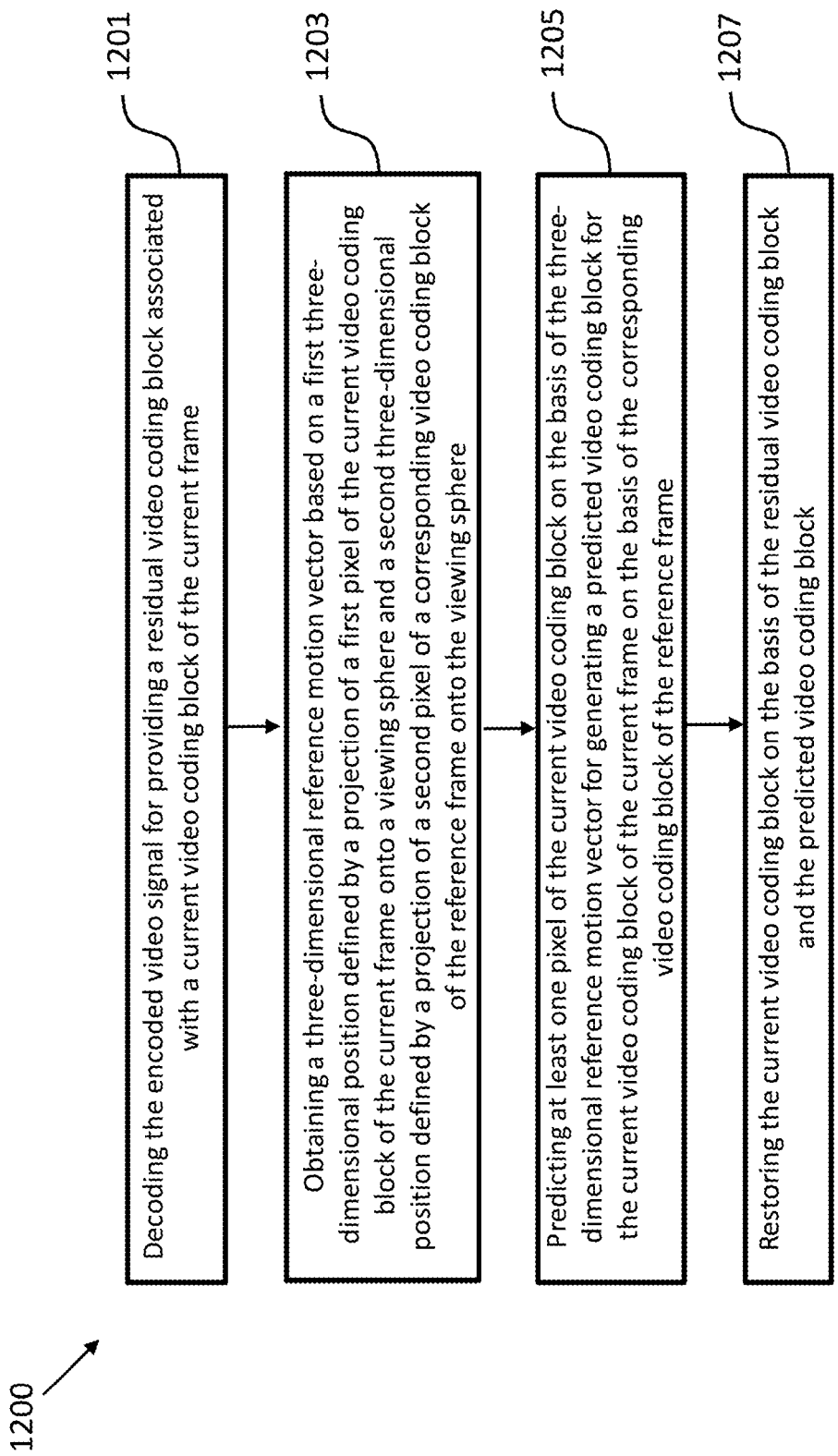
FIG. 12 shows a schematic diagram illustrating a method for decoding a video signal according to an embodiment.

FIG. 12 shows a schematic diagram illustrating a corresponding method 1200 for decoding a video signal according to an embodiment. The decoding method 1200 comprises the following steps: decoding 1201 the encoded video signal for providing a residual video coding block associated with a current video coding block 401 of the current frame 403; determining 1203 a 3D reference motion vector on the basis of a first 3D position defined by a projection of a first pixel of the current video coding block 401 of the current frame 403 onto a viewing sphere 501 and a second 3D position defined by a projection of a second pixel of a corresponding video coding block of the reference frame 405 onto the viewing sphere 501; predicting 1205 at least one pixel of the current video coding block 401 of the current frame 403 on the basis of the 3D reference motion vector to generate a predicted video coding block for the current video coding block 401 of the current frame 403 on the basis of the video coding block of the reference frame 405; and restoring 1207 the current video coding block 401 on the basis of the residual video coding block and the predicted video coding block.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

What is claimed is:

1. An encoding apparatus for encoding a video signal, the video signal being a two-dimensional (2D) projection of a panoramic video signal and comprising a plurality of successive frames including a reference frame and a current frame, each frame of the plurality of successive frames comprising a plurality of video coding blocks, each video coding block comprising a plurality of pixels, the encoding apparatus comprising computer hardware implementing a plurality of units, including:

an inter prediction unit for generating a predicted video coding block for a current video coding block of the current frame based on a corresponding video coding block of the reference frame, wherein the inter prediction unit is configured to:

determine a three-dimensional (3D) reference motion vector based on a first 3D position defined by a projection of a first pixel of the current video coding block of the current frame onto a viewing sphere and based on a second 3D position defined by a projection of a second pixel of the corresponding video coding block of the reference frame onto the viewing sphere, and predict at least one pixel of the current video coding block based on the 3D reference motion vector; and an encoding unit configured to encode the current video coding block of the current frame based on the predicted video coding block,
wherein the inter prediction unit is configured to predict the at least one pixel of the current video coding block based on the 3D reference motion vector by:
selecting a further pixel from the corresponding video coding block of the reference frame;
generating a modified 3D reference motion vector based on the 3D reference motion vector, wherein the modified 3D reference motion vector and the 3D reference motion vector have a same length, but different orientations;
adding the modified 3D reference motion vector to a third 3D position defined by a projection of the further pixel from the corresponding video coding block of the reference frame onto the viewing sphere to generate a fourth 3D position; and
determining a 2D position of the at least one pixel of the current video coding block by de-projecting the fourth 3D position onto the current frame.

2. The encoding apparatus of claim 1, wherein the inter prediction unit is further configured to:
determine the 3D reference motion vector as a vector connecting the first 3D position defined by the projection of the first pixel of the current video coding block of the current frame onto the viewing sphere with the second 3D position defined by the projection of the second pixel of the corresponding video coding block of the reference frame onto the viewing sphere.

3. The encoding apparatus of claim 1, wherein the inter prediction unit is configured to predict the at least one pixel of the current video coding block based on the 3D reference motion vector by:
selecting a further pixel from the corresponding video coding block of the reference frame;
generating a fourth 3D position by adding the 3D reference motion vector to a third 3D position defined by a projection of the further pixel from the corresponding video coding block of the reference frame onto the viewing sphere; and
determining a 2D position of the at least one pixel of the current video coding block by de-projecting the fourth 3D position onto the current frame.

4. The encoding apparatus of claim 1, wherein the current frame defines an equatorial line corresponding to an equatorial plane of the viewing sphere, and the inter prediction unit is configured to generate the modified 3D reference motion vector based on the 3D reference motion vector by:
determining a first great circle of the viewing sphere connecting the first 3D position defined by the projection of the first pixel of the current video coding block of the current frame onto the viewing sphere with the second 3D position defined by the projection of the second pixel of the corresponding video coding block of the reference frame onto the viewing sphere;
determining a second great circle of the viewing sphere containing the third 3D position defined by the projection of the further pixel from the corresponding video coding block of the reference frame onto the viewing sphere, wherein the first great circle and the second great circle intersect in the equatorial plane of the viewing sphere; and
determining the modified 3D motion vector as the vector connecting the third 3D position defined by the projection of the further pixel from the corresponding video coding block of the reference frame onto the viewing sphere and the fourth 3D position, wherein the fourth 3D position lies on the second great circle, and wherein the distance between the fourth 3D position and the third 3D position is equal to the distance between the first 3D position and the second 3D position.

5. The encoding apparatus of claim 1, wherein the inter prediction unit is further configured to:
predict a first subset of the plurality of pixels of the current video coding block based on the 3D reference motion vector and a second subset of the plurality of pixels of the current video coding block by interpolating the predicted first subset of the plurality of pixels to generate the predicted video coding block for the current video coding block of the current frame based on the corresponding video coding block of the reference frame.

6. The encoding apparatus of claim 1, wherein the encoding unit is further configured to encode the current video coding block of the current frame in combination with the 3D reference motion vector and/or a 2D projection of the 3D reference motion vector.

7. A method for encoding a video signal, the video signal being a two-dimensional (2D) projection of a panoramic video signal and comprising a plurality of successive frames including a reference frame and a current frame, each frame of the plurality of successive frames comprising a plurality of video coding blocks, each video coding block comprising a plurality of pixels, the encoding method comprising:
determining a three-dimensional (3D) reference motion vector based on a first 3D position defined by a projection of a first pixel of a current video coding block of the current frame onto a viewing sphere and based on a second 3D position defined by a projection of a second pixel of a corresponding video coding block of the reference frame onto the viewing sphere;
predicting at least one pixel of the current video coding block based on the 3D reference motion vector to generate a predicted video coding block for the current video coding block of the current frame based on the corresponding video coding block of the reference frame; and
encoding the current video coding block of the current frame based on the predicted video coding block,
wherein predicting the at least one pixel of the current video coding block based on the 3D reference motion vector comprises:
selecting a further pixel from the corresponding video coding block of the reference frame;
generating a modified 3D reference motion vector based on the 3D reference motion vector, wherein the modified 3D reference motion vector and the 3D reference motion vector have a same length, but different orientations;
adding the modified 3D reference motion vector to a third 3D position defined by a projection of the further pixel from the corresponding video coding block of the reference frame onto the viewing sphere to generate a fourth 3D position; and
determining a 2D position of the at least one pixel of the current video coding block by de-projecting the fourth 3D position onto the current frame.

8. A decoding apparatus for decoding a video signal, the video signal being a two-dimensional (2D) projection of a panoramic video signal and comprising a plurality of successive frames including a reference frame and a current frame, each frame of the plurality of successive frames comprising a plurality of video coding blocks, each video coding block comprising a plurality of pixels, the decoding apparatus comprising computer hardware implementing a plurality of units, including:
- a decoding unit configured to decode the video signal to provide a residual video coding block associated with a current video coding block of the current frame;
- an inter prediction unit for generating a predicted video coding block for a current video coding block of the current frame based on a corresponding video coding block of the reference frame, wherein the inter prediction unit is configured to:
  - obtain a three-dimensional (3D) reference motion vector based on a first 3D position defined by a projection of a first pixel of the current video coding block of the current frame onto a viewing sphere and a second 3D position defined by a projection of a second pixel of the corresponding video coding block of the reference frame onto the viewing sphere, and
  - predict at least one pixel of the current video coding block based on the 3D reference motion vector; and
- a restoration unit configured to restore the current video coding block based on the residual video coding block and the predicted video coding block,
- wherein the inter prediction unit is configured to predict the at least one pixel of the current video coding block based on the 3D reference motion vector by:
- selecting a further pixel from the corresponding video coding block of the reference frame;
- generating a modified three-dimensional reference motion vector based on the 3D reference motion vector, wherein the modified 3D reference motion vector and the 3D reference motion vector have the same length, but different orientations;
- adding the modified 3D reference motion vector to a third 3D position defined by a projection of the further pixel from the corresponding video coding block of the reference frame onto the viewing sphere to generate a fourth three-dimensional position; and
- determining a 2D position of the at least one pixel of the current video coding block by de-projecting the fourth 3D position onto the current frame.

9. The decoding apparatus of claim 8, wherein the 3D reference motion vector is a vector connecting the first 3D position defined by the projection of the first pixel of the current video coding block of the current frame onto the viewing sphere with the second 3D position defined by the projection of the second pixel of the corresponding video coding block of the reference frame onto the viewing sphere.

10. The decoding apparatus of claim 8, wherein the inter prediction unit is configured to predict the at least one pixel of the current video coding block based on the 3D reference motion vector by:
- electing a further pixel from the corresponding video coding block of the reference frame;
- generating a fourth 3D position by adding the 3D reference motion vector to a third 3D position defined by a projection of the further pixel from the corresponding video coding block of the reference frame onto the viewing sphere; and
- determining a 2D position of the at least one pixel of the current video coding block by de-projecting the fourth 3D position onto the current frame.

11. The decoding apparatus of claim 8, wherein the current frame defines an equatorial line corresponding to an equatorial plane of the viewing sphere and the inter prediction unit is configured to generate the modified 3D reference motion vector based on the 3D reference motion vector by:
- determining a first great circle of the viewing sphere connecting the first 3D position defined by the projection of the first pixel of the current video coding block of the current frame onto the viewing sphere with the second 3D position defined by the projection of the second pixel of the corresponding video coding block of the reference frame onto the viewing sphere;
- determining a second great circle of the viewing sphere containing the third 3D position defined by the projection of the further pixel from the corresponding video coding block of the reference frame onto the viewing sphere, wherein the first great circle and the second great circle intersect in the equatorial plane of the viewing sphere; and
- determining the modified 3D motion vector as the vector connecting the third 3D position defined by the projection of the further pixel from the corresponding video coding block of the reference frame onto the viewing sphere and the fourth 3D position, wherein the fourth 3D position lies on the second great circle and wherein the distance between the fourth 3D position and the third 3D position is equal to the distance between the first 3D position and the second 3D position.

12. The decoding apparatus of any one of claim 8, wherein the inter prediction unit is configured to predict a first subset of the plurality of pixels of the current video coding block based on the 3D reference motion vector and a second subset of the plurality of pixels of the current video coding block by interpolating the predicted first subset of the plurality of pixels for generating the predicted video coding block for the current video coding block of the current frame based on the corresponding video coding block of the reference frame.

13. The decoding apparatus of any one of claim 8, wherein the inter-prediction unit is configured to obtain the 3D reference motion vector and/or a 2D projection of the 3D reference motion vector by extracting the 3D reference motion vector and/or a 2D projection of the 3D reference motion vector from the encoded video signal.

14. A method for decoding a video signal, the video signal being a two-dimensional (2D) projection of a panoramic video signal and comprising a plurality of successive frames including a reference frame and a current frame, each frame of the plurality of successive frames comprising a plurality of video coding blocks, each video coding block comprising a plurality of pixels, the decoding method comprising:
- decoding the video signal for providing a residual video coding block associated with a current video coding block of the current frame;
- obtaining a three-dimensional (3D) reference motion vector based on a first 3D position defined by a projection of a first pixel of the current video coding block of the current frame onto a viewing sphere and a second 3D position defined by a projection of a second pixel of a corresponding video coding block of the reference frame onto the viewing sphere;
- predicting at least one pixel of the current video coding block based on the 3D reference motion vector to generate a predicted video coding block for the current video coding block of the current frame based on the corresponding video coding block of the reference frame; and restoring the current video coding block based on the residual video coding block and the predicted video coding block, wherein predicting the at least one pixel of the current video coding block based on the 3D reference motion vector comprises:

selecting a further pixel from the corresponding video coding block of the reference frame;

generating a modified three-dimensional reference motion vector based on the 3D reference motion vector, wherein the modified 3D reference motion vector and the 3D reference motion vector have the same length, but different orientations;

adding the modified 3D reference motion vector to a third 3D position defined by a projection of the further pixel from the corresponding video coding block of the reference frame onto the viewing sphere to generate a fourth three-dimensional position; and determining a 2D position of the at least one pixel of the current video coding block by de-projecting the fourth 3D position onto the current frame.

15. A computer program stored on a non-transitory computer readable medium comprising program code for performing the method of claim 7 when executed by hardware on a computer.

16. A computer program stored on a non-transitory computer readable medium comprising program code for performing the method of claim 14 when executed by hardware on a computer.

* * * * *